United States Patent [19]

Schutten et al.

[11] Patent Number: 4,459,535

[45] Date of Patent: Jul. 10, 1984

[54] H-SWITCH START-UP CONTROL AND FREQUENCY CONVERTER FOR VARIABLE SPEED AC MOTOR

[75] Inventors: Herman P. Schutten; Robert W. Sackett, both of Milwaukee; Jan K. Sedivy, Elm Grove; Michael E. Taken, Cedarburg, all of Wis.

[73] Assignee: Eaton Corporation, Cleveland, Ohio

[21] Appl. No.: 402,865

[22] Filed: Jul. 29, 1982

[51] Int. Cl.³ .................. H02P 5/34; H02M 5/02
[52] U.S. Cl. ................... 318/808; 318/807; 363/149
[58] Field of Search ............ 318/781, 798, 799, 768, 318/797, 746, 747, 816, 806–811, 812, 767; 307/154, 155, 127, 240, 513, 262; 363/36, 148, 49, 57, 58, 156, 149, 151, 157, 159–163, 165; 323/212, 217

[56] References Cited

U.S. PATENT DOCUMENTS 4,117,364 9/1978 Baker .............................. 318/781 X

FOREIGN PATENT DOCUMENTS 688969 9/1979 U.S.S.R. .............................. 363/148

OTHER PUBLICATIONS

Andrews, Dallas R., "Diode Used for Motor Starting," RCA Technical Notes; 705; Jan. 1967.
"Power Transistor Applications for Switching Regulators & Motor Control", Marvin Smith, General Elec. Co., Semiconductors Prod. Dept., Auburn, N.Y., Oct. 1979, pp. 22-23.
"Static Power Frequency Changers", Guygui and Pelly, John Wiley & Sons, N.Y., 1976.

Primary Examiner—G. Z. Rubinson
Assistant Examiner—Patrick C. Keane
Attorney, Agent, or Firm—Andrus, Sceales, Starke & Sawall

[57] ABSTRACT

A simple combinational technique is disclosed using one or more H-switches for start-up control and frequency conversion in an AC motor. A coordinating logic system provides H-switch toggling timing patterns yielding phase shifted voltage waveforms in the motor windings to afford a rotating field during start-up, and provides irregular switching times yielding a chopped sinusoid output waveform of converted frequency for variable speed operation.

41 Claims, 8 Drawing Figures

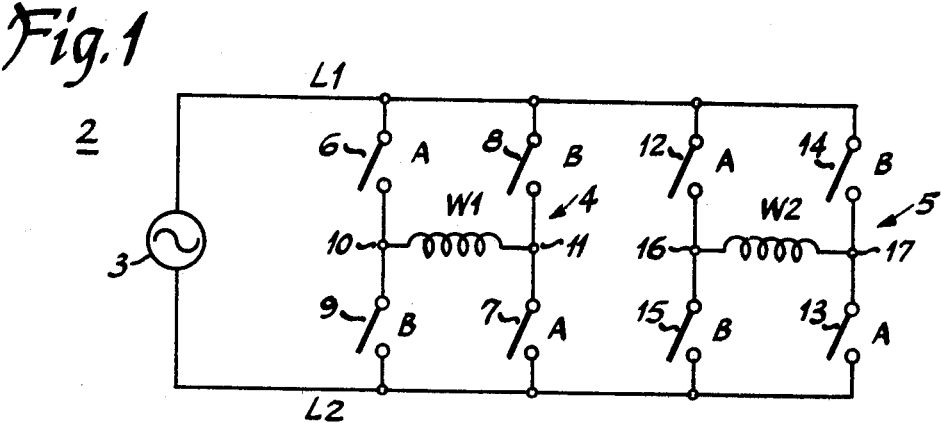
Fig. 1
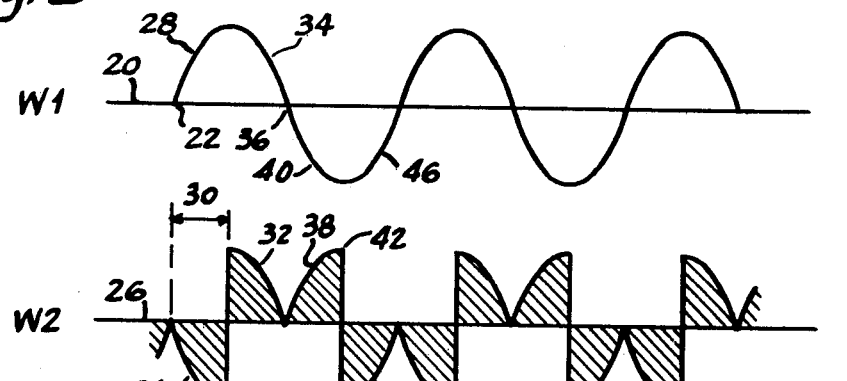
Fig. 2
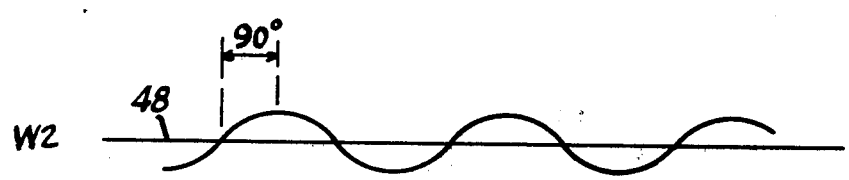
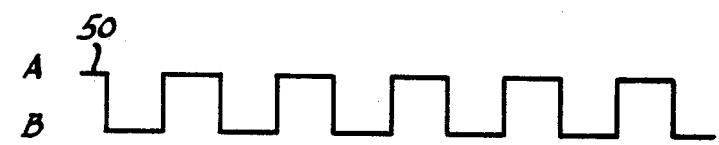

4,459,535

H-SWITCH START-UP CONTROL AND FREQUENCY CONVERTER FOR VARIABLE SPEED AC MOTOR

TECHNICAL FIELD

The invention relates to a combination start-up control and frequency conversion technique for AC motors by providing phase shifted fields in the motor windings, to afford a rotating magnetic field for start-up, and providing a frequency converted run mode.

BACKGROUND AND SUMMARY

Various techniques are known for establishing a rotating field in an AC motor by providing phase shifted fields in separate windings. Numerous systems are known for providing the phase shift, including various combinations of resistors, capacitors or inductors to store electrical energy, and then release it as phase shifted alternating current.

Various AC frequency conversion techniques are likewise known in the art, including the use of an H-switch for such purpose. In one type of single phase cycloconverter, an H-switch connects a motor winding to a pair of power lines L1 and L2 supplied by an AC source. The H-switch has one ON state connecting L1 to the left end of the motor winding and connecting L2 to the right end of the motor winding. The H-switch has another ON state connecting L2 to the left end of the motor winding and connecting L1 to the right end of the winding. The H-switch is switched between its two ON states at a given periodic frequency which mixes with the frequency of the input AC signal in heterodyning relation to yield various output frequencies, analogous to side bands. For example, if a 60 hertz input AC signal is mixed with a switching rate of 132 hertz for the H-switch, a plurality of side bands result, including 72 hertz, 192 hertz, 336 hertz, etc., *Static Power Frequency Changers*, Gyugyi and Pelly, John Wiley & Sons, N.Y., 1976. In the classical cycloconverter approach, during a given half cycle of the output frequency, the output waveform may be constituted by a plurality of segments of both positive and negative polarity, for example pages 56, 57 and 168 of the noted Gyugyi reference.

The present invention provides a particularly simple technique for using H-switches to provide the requisite phase shift for starting an AC motor in combination with the provision of a frequency converted run mode after start-up. In the start-up mode, one or more H-switches are used to provide the desired phase shift between first and second motor windings for motor start-up, without energy-storage capacitors or inductors. At the termination of the start-up mode, the first motor winding is disconnected from the AC source, and an irregular timing pattern is used to toggle the H-switch for the second winding between its two ON states. This irregular timing of H-switch switching yields a chopped sinusoid output waveform of a given fundamental frequency. In preferred form, the H-switch is toggled in response to a given frequency clock signal and is also toggled in response to each zero crossing of the input AC signal except when a zero crossing and a clock signal coincide in time. In contrast to the classical cycloconverter approach, in the present invention the output waveform in any half cycle during the frequency converted run mode is constituted by segments of common polarity.

The present invention provides in preferred form a start-up control and a frequency conversion combination with a simple logic system coordinating the requisite timing pattern for switching one or more H-switches and their respective motor windings between one ON state and an OFF state in a given sequence during start-up to afford the requisite phase shift and a rotating field, and providing the requisite irregular timing pattern to switch one of the H-switches and its motor winding between one and another ON state to yield a frequency converted chopped sinusoid output waveform. The coordinating logic system combination provides a high degree of flexibility with a minimum number of parts, including common usage of parts in each mode.

BRIEF DESCRIPTION OF THE DRAWINGS

FIG. 1 is a schematic circuit diagram for illustrating the H-switch start-up control and frequency conversion technique of the present invention.

FIG. 2 is a timing diagram illustrating start-up operation of the circuit of FIG. 1.

DETAILED DESCRIPTION

Figure 3:
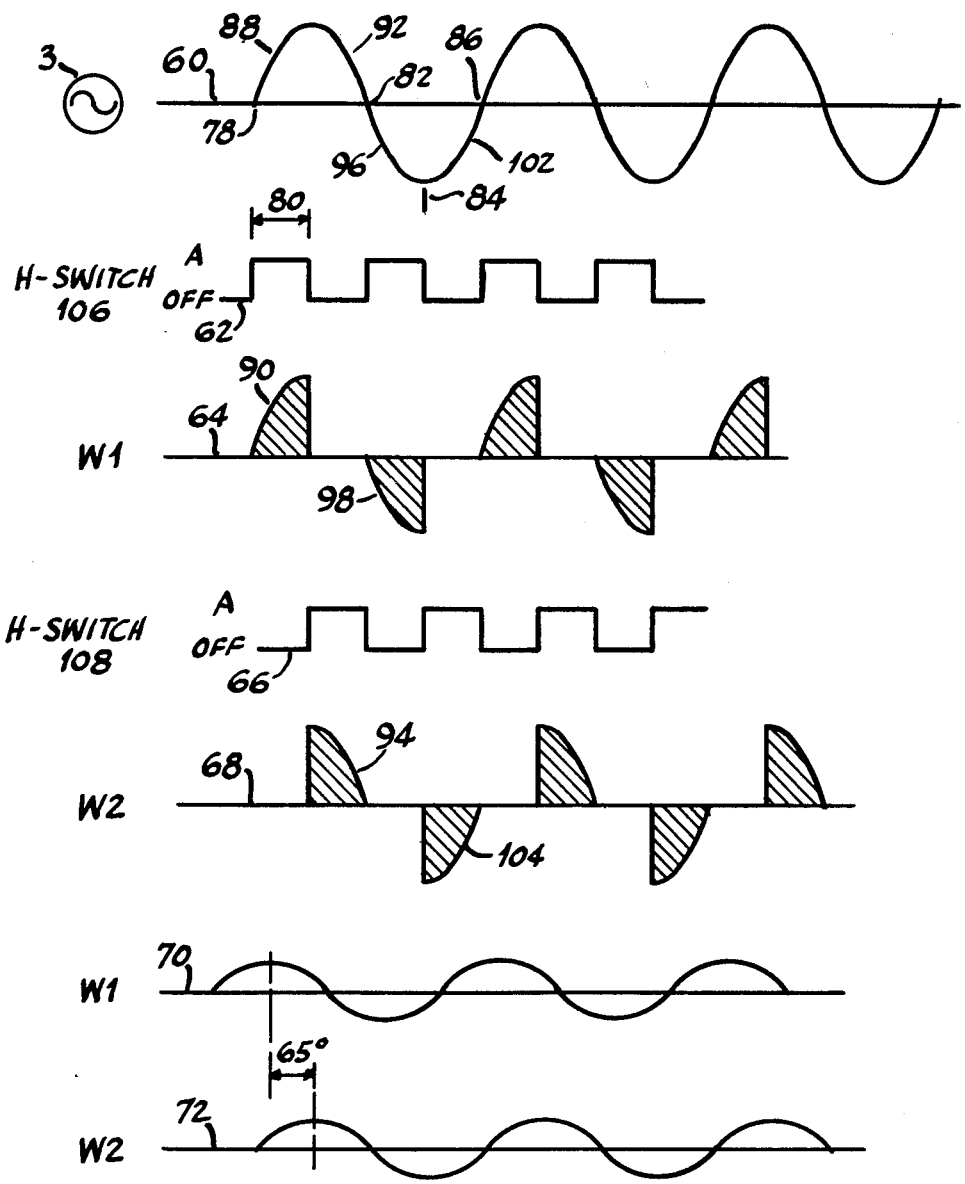
FIG. 3 is a timing diagram illustrating alternative start-up operation of the circuit of FIG. 1.

FIG. 1 shows a motor control circuit 2 having a pair of power lines L1 and L2 supplied by a single phase AC source 3. First and second motor windings W1 and W2 are connected respectively by first and second H-switches 4 and 5 to L1 and L2. H-switches are well known, and commonly used in cycloconverters.

H-switch 4 has one ON state A in which switches 6 and 7 are closed and switches 8 and 9 are open such that L1 is connected to the left end 10 of W1 and L2 is connected to the right end 11 of W1. H-switch 4 has another ON state B in which switches 6 and 7 are open and switches 9 and 8 are closed such that L2 is connected to the left end 10 of W1 and L1 is connected to the right end 11 of W1. H-switch 4 has an OFF state in which each of switches 6, 7, 8 and 9 is open such that W1 is disconnected from AC source 3. Alternatively, any one of switches 6, 7, 8 or 9 can remain closed, or the two switches 6 and 8 can remain closed or the two switches 9 and 7 can remain closed during the OFF state of H-switch 4, and W1 will still be disconnected from AC source 3. Many H-switches require a snubber circuit (not shown) in parallel with the load for transient suppression and voltage spike protection during the OFF state.

H-switch 5 has one ON state A in which switches 12 and 13 are closed and switches 15 and 14 are open such that L1 is connected to the left end 16 of W2 and L2 is connected to the right end 17 of W2. H-switch 5 has another ON state B in which switches 12 and 13 are open and switches 15 and 14 are closed, such that L2 is connected to the left end 16 of W2 and L1 is connected to the right end 17 of W2. H-switch 5 has an OFF state in which switches 12, 13, 14 and 15 are all open, thus disconnecting winding W2 from AC source 3. Alternatively, any one of switches 12, 13, 14 or 15 can remain closed, or the two switches 12 and 14 can remain closed, or the two switches 15 and 13 can remain closed during the OFF state of H-switch 5, and W2 will still be disconnected from AC source 3.

It is preferred that in the OFF state the energy inductively stored in the winding be allowed to gradually decrease by freewheeling. For example, when H-switch 5 switches from its one ON state A to its OFF state, switches 15 and 13 are closed to provide a short circuit around the winding and allow the freewheeling gradual decrease of inductively stored energy therethrough from the winding. This freewheeling is known in the art.

In one start-up implementation, one of the H-switches is left in an ON state and the other H-switch is switched between its two ON states according to a designated pattern to yield a resultant voltage waveform in its motor winding phase shifted from the voltage waveform in the other motor winding. In the timing diagram of FIG. 2, H-switch 4 is left in its ON state A, or is left in its ON state B for reverse motor shaft rotation. Timing line 20 shows the AC signal from source 3, which appears across W1. At zero crossing 22, H-switch 5 is switched to its other ON state B with switches 14 and 15 closed to thus connect L1 to the right end 17 of W2 and connect L2 to the left end 16 of W2. The waveform segment 24 in W2 as shown on timing line 26 is thus the inversion of the waveform segment 28 in W1. After a given delay 30, which is preferably equal to about a quarter cycle of the AC source, H-switch 5 is switched OFF briefly and then switched back to its one ON state A with switches 14 and 15 open, and switches 12 and 13 closed. This connects L1 to the left end 16 of W2 and connects L2 to the right end 17 of W2. The waveform segment 32 in W2 is thus the same as like-going waveform segment 34 in W1. At the first successive next zero crossing 36 of the AC signal, H-switch 5 is toggled, and switches from ON state A momentarily through an OFF state to ON state B such that L1 is connected to the right end 17 of W2 and L2 is connected to the left end 16 of W2. The waveform segment 38 in W2 is thus the inversion of the waveform segment 40 in W1, i.e. as waveform segment 40 falls from zero, waveform segment 38 rises from zero. After the given delay following zero crossing 36, H-switch 5 again switches at time point 42 to its other ON state B such that waveform segment 44 in W2 corresponds to a like-going waveform segment 46 in W1 and rises towards zero.

In one form H-switch 5 is cyclically and alternately switched between said one and said other ON states at twice the frequency of AC input signal zero crossings of AC source 3. H-switch 5 is switched to its other ON state B at each zero crossing of the AC signal. H-switch 5 is switched to its one ON state A after given delay 30 following each zero crossing and before the next successive zero crossing. In this form, delay 30 is equal to about one-fourth of a period of the AC signal from source 3, i.e. is equal to a quarter cycle of the AC signal.

As seen on timing lines 20 and 26, the rising from zero first quarter cycle waveform 28 in W1 corresponds to an opposite-going falling from zero first quarter cycle chopped waveform 24 in W2. The second quarter cycle falling toward zero waveform 34 in W1 corresponds to a like-going falling toward zero second quarter cycle chopped waveform 32 in W2. The third quarter cycle falling from zero waveform 40 in W1 corresponds to an opposite-going third quarter cycle rising from zero chopped waveform 38 in W2. The fourth quarter cycle rising toward zero waveform 46 in W1 corresponds to a like-going fourth quarter cycle rising toward zero chopped waveform 44 in W2. The second and fourth quarter cycle chopped waveforms 32 and 44 in W2 are the same as 34 and 46 in W1. The first and third quarter cycle chopped waveforms 24 and 38 in W2 are the inversions of the waveforms 28 and 40 in W1.

The fundamental frequency component of the various chopped segments on timing line 26 is shown on timing line 48. The resultant waveform on line 48 is shifted by 90° from the waveform in W1 on line 20. This 90° phase shift between windings W1 and W2 provides the rotating field for motor start-up. Timing line 50 in FIG. 2 shows the timed switching control for toggling H-switch 5 between its one ON state A and its other ON state B. This switching signal toggles at twice the frequency of AC input signal zero crossings of the AC source 3, such that the resultant voltage waveform in W2 is 90° out of phase with the voltage waveform in W1. This is accomplished without energy-storage phasing capacitors or inductors.

In another start-up mode control technique, both H-switches are toggled according to a designated sequence. In the timing diagram in FIG. 3, timing line 60 shows the AC signal from source 3. Timing line 62 shows the toggling of H-switch 4 to switch between its its one ON state A and its OFF state. This results in the chopped waveform shown on timing line 64 in winding W1. Timing line 66 shows the toggling of H-switch 5 to switch between its one ON state A and its OFF state. This results in the chopped switched waveform in W2 shown on timing line 68. The fundamental frequency component of the chopped waveform segments on timing line 64 is shown in line 70 for W1. The fundamental frequency component of the chopped waveform segments in W2 on timing line 68 is shown in line 72. The resultant waveform in W2 on line 72 is approximately 65° out of phase with the resultant waveform in W1 on line 70. This phase shift provides the rotating field for motor start-up, and is accomplished without energy-storage phasing capacitors or inductors.

Referring to FIG. 3, H-switch 4 is switched to its ON state A and H-switch 5 is switched to its OFF state at a zero crossing 78 of the AC signal. Then after a given delay 80 and before the first successive next zero crossing 82, H-switch 4 is switched to its OFF state and H-switch 5 is switched to its ON state A. Then at the first successive next zero crossing 82, H-switch 4 is switched back to its ON state A and H-switch 5 is switched back to its OFF state. Then after another given delay following zero crossing 82, the H-switches are again toggled at 84 such that H-switch 4 switches to its OFF state and H-switch 5 switches to its ON state A. Then at the second successive zero crossing 86, the H-switches are again toggled and H-switch 4 switches to its one ON state A and H-switch 5 switches to its OFF state, and so on.

In the operation illustrated in FIG. 3, the other ON state B of H-switches 4 and 5 is not used. In an alternative, the H-switches are toggled between their OFF states and their B ON states, without using the A ON state. In another alternative, either one of the H-switches is toggled between its OFF state and its B ON state, while the other H-switch remains as described in the preceding paragraph. This latter alternative provides an opposite rotating field for motor start-up in the reverse direction.

In one form, delay 80 is equal to one-quarter of a period of the AC signal, i.e. the delay equals a quarter cycle of the AC signal. H-switches 4 and 5 are cyclically and alternately toggled in opposition between ON state A and the OFF state at twice the frequency of AC input signal zero crossings. As seen in FIG. 3, the first quarter cycle waveform 88 of the AC signal corresponds to a like-going first quarter cycle chopped waveform 90 in W1. The second quarter cycle waveform 92 of the AC signal is provided as a like-going second quarter cycle chopped waveform 94 in W2. The third quarter cycle waveform 96 of the AC signal is provided as a like-going third quarter cycle chopped waveform 98 in W1. The fourth quarter cycle waveform 102 of the AC signal is provided as a like-going fourth quarter cycle chopped waveform 104 in W2. The first and third quarter cycle waveform segments of the AC signal are thus provided as like-going quarter cycle chopped waveforms in W1. The second and fourth quarter cycle waveform segments of the AC signal are provided as like-going chopped quarter cycle waveforms in W2.

Figure 4:
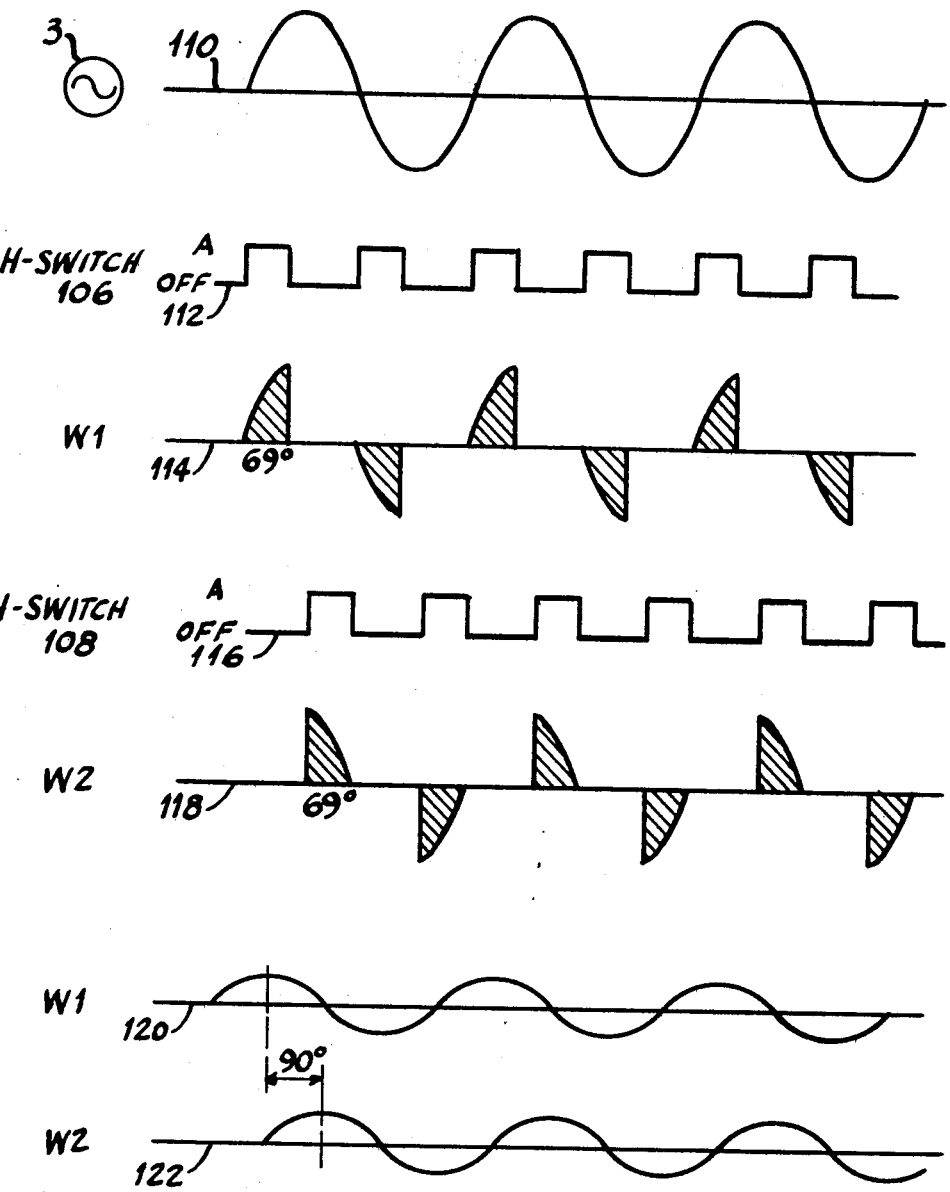
FIG. 4 is a timing diagram illustrating further alternative start-up operation of the circuit of FIG. 1.

FIG. 4 shows alternative operation to that of FIG. 3. Timing line 110 shows the AC signal from source 3. Timing line 112 shows the toggling of H-switch 4 to switch between its one ON state A and its OFF state, resulting in the chopped waveform shown on timing line 114 in winding W1 which is energized for 69° following a zero crossing of the AC signal. Timing line 116 shows the toggling of H-switch 5 to switch between its one ON state A and its OFF state, resulting in the chopped switched waveform in W2 on timing line 118 which is energized for 69° preceding the next zero crossing of the AC signal. As seen in FIG. 4, for the first half cycle of the AC signal, winding W1 is energized for the first 69°, then both H-switches are OFF for 42°, and then winding W2 is energized for the remaining 69° of the first half cycle, and so on. The fundamental frequency component of the chopped waveform segments on timing line 114 is shown in line 120; and the fundamental frequency component of the chopped waveform segments in W2 on timing line 118 is shown on line 122. The resultant waveform in W2 on line 122 is approximately 90° out of phase with the resultant waveform in W1 on line 120. This phase shift provides the rotating field for motor start-up, and is accomplished without energy-storage phasing capacitors or inductors.

Figure 5:
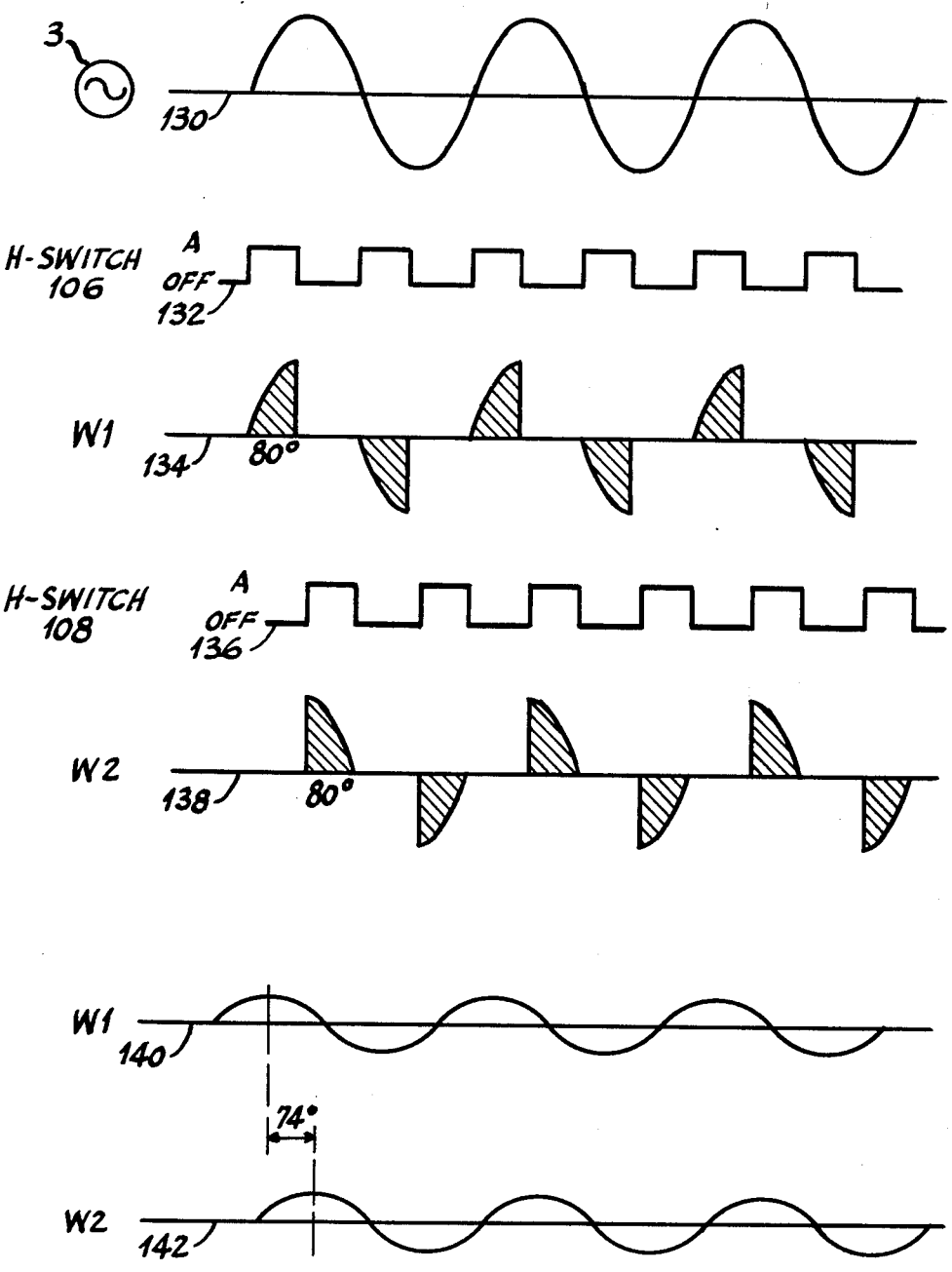
FIG. 5 is a timing diagram illustrating further alternative start-up operation of the circuit of FIG. 1.

FIG. 5 shows the preferred operation of motor control circuit 2 of FIG. 1 during start-up. Timing line 130 shows the AC signal from source 3. Timing line 132 shows the toggling of H-switch 4 to switch between its one ON state A and its OFF state, resulting in the chopped waveform shown on timing line 134 in winding W1 energized for 80° following a zero crossing of the AC signal. Timing line 136 shows the toggling of H-switch 5 to switch between its one ON state A and its OFF state, resulting in the chopped switched waveform on timing line 138 in winding W2 energized for 80° preceding the next zero crossing of the AC signal. As seen in FIG. 5, for the first half cycle of the AC signal, winding W1 is energized for the first 80°, then both H-switches are OFF for 20°, and then winding W2 is energized for the remaining 80°, and so on. The fundamental frequency component of the chopped waveform segments on timing line 134 is shown on line 140; and the fundamental frequency component of the chopped waveform segments in W2 on timing line 138 is shown on line 142. The fundamental frequency waveform in W2 on line 142 is approximately 74° out of phase with the fundamental frequency waveform in W1 on line 140. This phase shift provides the rotating field for motor start-up, and has been found to provide the optimum combination of phase shift and start-up power.

Figure 6:
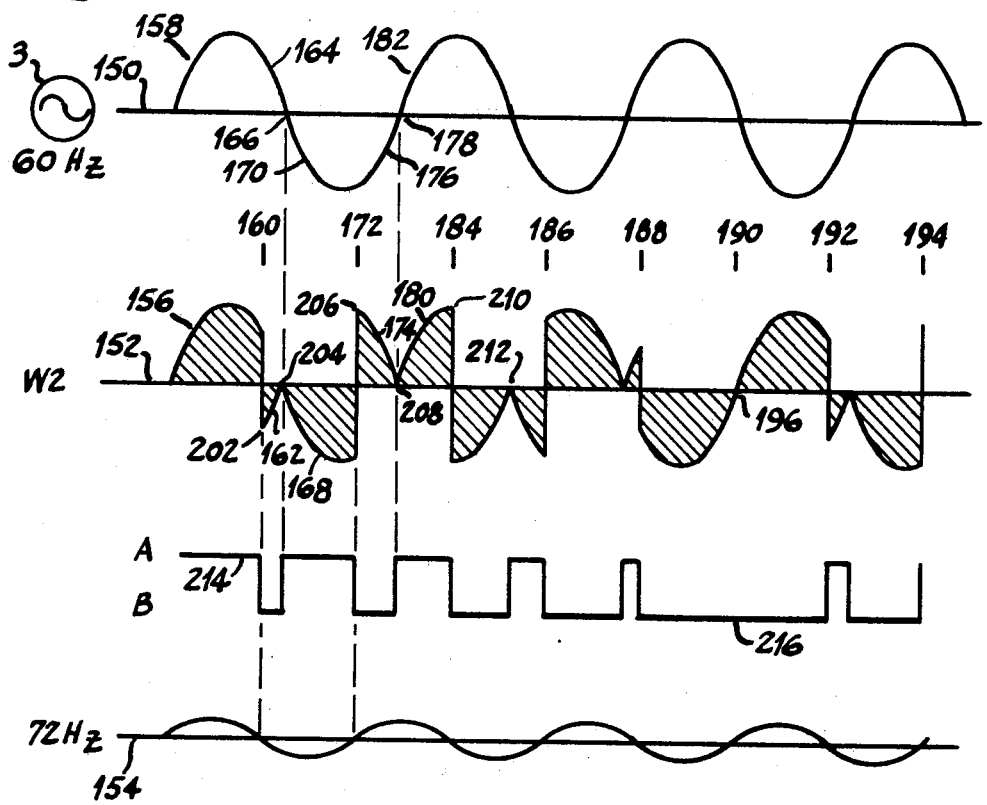
FIG. 6 is a timing diagram illustrating frequency converted operation of the circuit of FIG. 1.

Upon termination of the start-up mode, for example at a given motor speed, H-switch 4 is switched to its OFF state with switches 6, 7, 8 and 9 open, disconnecting W1 from AC source 3, and H-switch 5 is switched to one or the other of its ON states A or B to run the motor at the frequency of the AC source, or H-switch 5 is toggled in accordance with the timing pattern in FIG. 6 to effect frequency conversion and run the motor at a different speed.

In the frequency converted run mode, with H-switch 4 OFF, H-switch 5 is alternately switched between ON states A and B at irregular times to yield a switched output waveform of a given fundamental frequency. Timing line 150 in FIG. 6 shows the AC input signal from source 3, for example 60 hertz. Timing line 152 shows a chopped sinusoid output waveform through W2. The fundamental frequency component of the waveform in W2 in this example is shown on line 154 and is 72 hertz. H-switch 5 is initially in its one ON state A such that the output waveform at W2 has a positive segment 156 which tracks a positive segment 158 of the input AC signal from L1. At a clock signal at time 160, H-switch 5 is toggled to switch to its other ON state B, resulting in output waveform segment 162 which tracks the remainder segment 164 of the first half cycle wave segment on L1 but in the reverse direction through W2.

At zero crossing 166, H-switch 5 toggles again to switch back to its one ON state A, resulting in output waveform segment 168 which tracks like-going negative wave segment 170 on L1. At the next clock signal at time 172, H-switch 5 is again toggled to transition to its other ON state B, resulting in output waveform segment 174 which is the inversion of waveform segment 176 of the input AC signal. At zero crossing 178, H-switch 5 is again toggled to its A state, resulting in output waveform segment 180 which tracks in like-going relation waveform segment 182 of the AC input signal.

In the example given, a 144 hertz clock signal is used such that the clock signal occurs at times 160, 172, 184, 186, 188, 190, 192, 194, etc. H-switch 5 is toggled between its two ON states A and B in response to each clock signal, and is also toggled between states A and B in response to each zero crossing of the AC signal except when a zero crossing and a clock signal coincide in time, as shown at 196. The chopped sinusoid output waveform at W2 has an inflection point at each toggled transition between ON states A and B of the H-switch, as shown at inflection points 202, 204, 206, 208, 210, 212, etc.

The output waveform at W2 has a positive half cycle during which H-switch 5 is switched to the one ON state A when L1 is positive with respect to L2 and is switched to the other ON state B when L2 is positive with respect to L1. The output waveform at W2 has a negative half cycle during which H-switch 5 is switched to the one ON state A when L1 is negative with respect to L2 and switched to the other ON state B when L2 is negative with respect to L1. For example, during the negative half cycle of the output waveform at W2 provided by segments 162 and 168, H-switch 5 is switched to its ON state B for segment 162 and to its ON state A for segment 168. For the positive half cycle in the waveform at W2 provided by segments 174 and 180, H-switch 5 is switched to its ON state B for segment 174 and to its ON state A for segment 180.

Timing signal 214 shows the irregular switch timing for toggling H-switch 5 between ON states A and B. A toggled transition of H-switch 5 occurs at each clock signal and at each zero crossing of the input AC signal except when they coincide, as shown at 216 where no transition has occurred.

Figure 7:
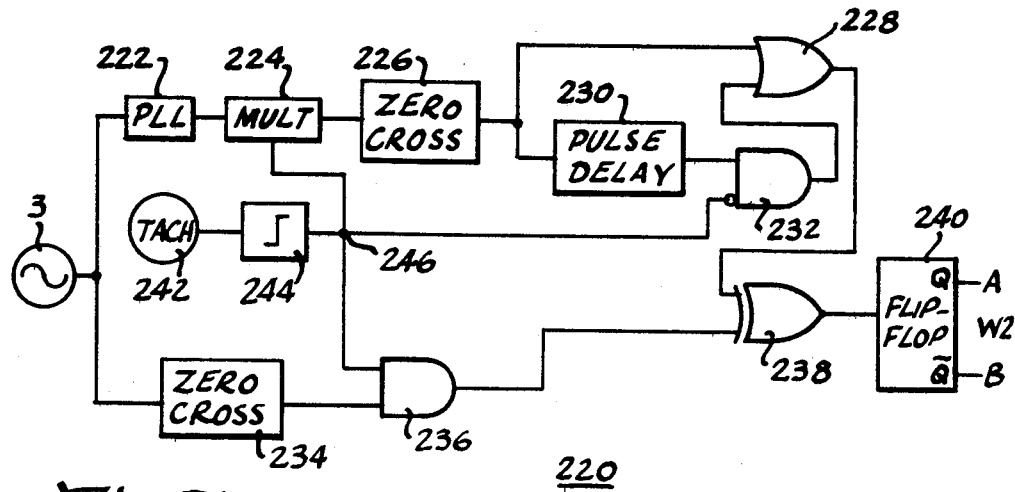
FIG. 7 is a schematic circuit diagram illustrating the timing control for operation of the circuit of FIG. 1 in accordance with FIGS. 2 and 6.

FIG. 7 shows the logic system for implementing the timing in FIGS. 2 and 6 and coordinating the combined timing control in accordance therewith. Combined timing control circuit 220 includes a phase lock loop 222 extracting the frequency of the input AC signal from source 3. This extracted AC input frequency is delivered to a clock multiplier 224, such as a frequency synthesizer. Multiplier 224 is normally in a non-activated state and does not alter the frequency, i.e. it performs a multiply by one operation. A zero crossing detector 226 generates an output pulse in response to each zero crossing of the signal from multiplier 224. The output pulses of zero crossing detector 226 are delivered to one input of an OR gate 228, and are also delivered through a pulse delay 230 and an AND gate 232 to the other input of OR gate 228. AC source 3 is also connected to another zero crossing detector 234 whose output is delivered through AND gate 236 to one input of an exclusive OR gate 238. The other input to exclusive OR gate 238 is from gate 228. The output of exclusive OR gate 238 toggles flip-flop 240 between its Q and $\bar{Q}$ outputs to switch H-switch 5 between its ON states A and B.

During start-up, tachometer 242 outputs a speed-indicative signal which is not great enough to trigger a given level detector 244, such that the output on line 246 is low, and multiplier 224 remains in its non-actuated condition. This low state on line 246 is inverted high at the inverting input of AND gate 232, whereby to enable the latter and permit passage therethrough of pulses from circuit 230 to gate 228. Line 246 is also connected to one of the inputs of AND gate 236, whereby the low state of line 246 disables gate 236 and the latter blocks passage therethrough of zero crossing pulses from circuit 234 to gate 238. As an alternative, a centrifugal switch on the motor shaft may supply a high state on line 246 as soon as the motor speed is high enough.

The pulse delay at 230 is preferably chosen to be approximately a quarter cycle, 90°, of the AC signal such that flip-flop 240 is toggled at each zero crossing and also at approximately the midpoint between each zero crossing, resulting in the timed toggling signal 50, FIG. 2. It is thus seen that in the start-up condition, flip-flop 240 is toggled at each zero crossing of the AC signal from source 4, and is also toggled after a given delay following each zero crossing and before the next successive zero crossing.

When the motor speed reaches a given level, the output of level detector 244 on line 246 transitions high, which in turn activates clock multiplier 224, disables gate 232, and enables gate 236. In the example in FIG. 6, the given multiple for multiplier 224 is 6/5. The output of zero crossing detector 226 then provides the given frequency clock signal of FIG. 6, e.g. the 144 hertz clock pulses 156, 160, 172, 184, 186, 188, 190, 192, 194, etc. This clock signal is delivered through gate 228 to one of the inputs to exclusive OR gate 238. There are no delayed pulses from circuit 230 delivered through gate 228 because AND gate 232 is disabled. Zero crossings of the AC input signal are detected by zero crossing detector 234 and delivered through enabled AND gate 236 to the other input of exclusive OR gate 238. As noted, the other input to exclusive OR gate 238 is supplied by the clock signal provided by the given multiple of AC input signal zero crossings. The output of exclusive OR gate 238 toggles flip-flop 240 between its Q and $\bar{Q}$ outputs to switch H-switch 5 between ON states A and B as shown in FIG. 6.

Figure 8:
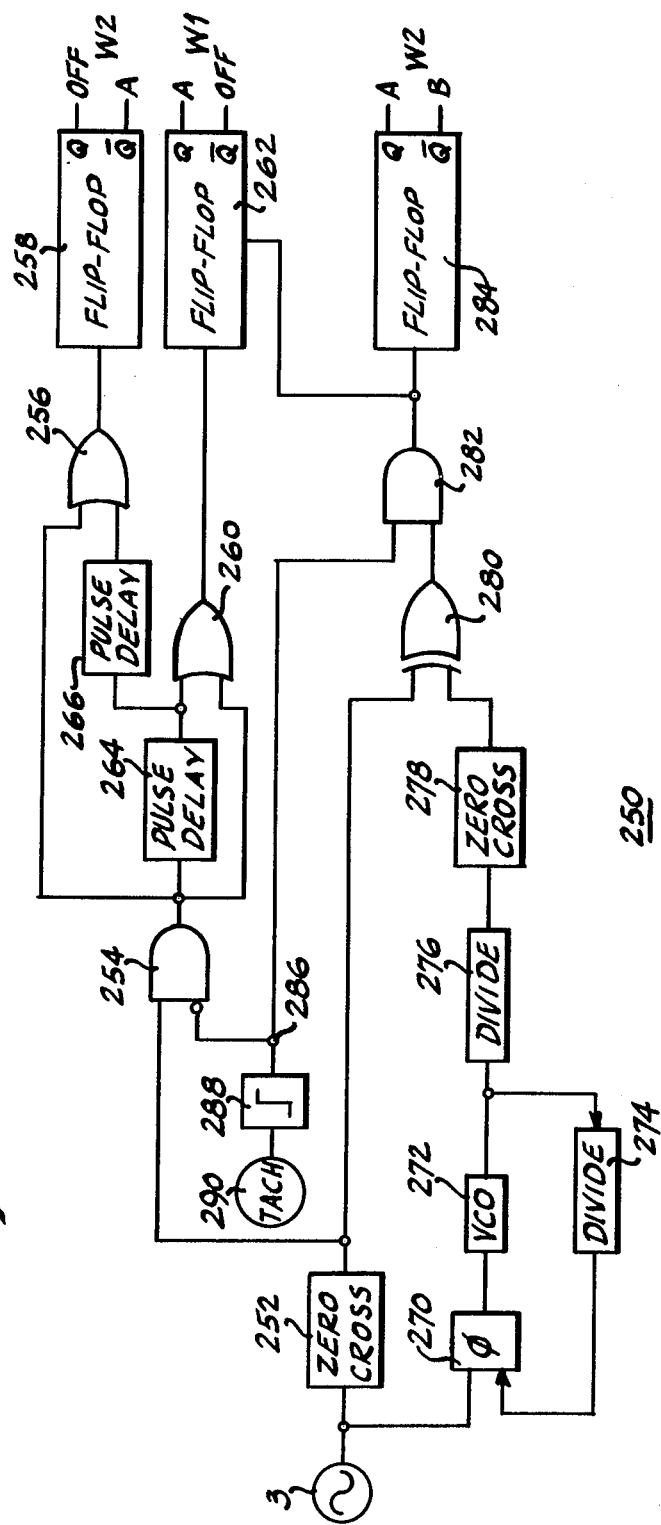
FIG. 8 is a schematic circuit diagram illustrating the timing control for the operation of the ciruit of FIG. 1 in accordance with FIGS. 3 through 6.

FIG. 8 shows a coordinated timing control logic system 250 for implementing the timing in FIGS. 3 through 6. A zero crossing detector 252 generates an output pulse in response to each zero crossing of the AC signal from source 3. The output pulses from zero crossing detector 252 are delivered through AND gate 254 and OR gate 256 to toggle flip-flop 258 between its Q and $\bar{Q}$ outputs to switch H-switch 5 between its ON state A and its OFF state. The output pulses from zero crossing detector 252 are also delivered through AND gate 254 and an OR gate 260 to toggle flip-flop 262 to switch H-switch 4 between its ON state A and its OFF state. Flip-flop 262 is also toggled after a delay provided by pulse delay 264, and flip-flop 258 is also toggled after a further delay provided by pulse delay 266.

In operation during start-up, a zero crossing of the AC signal toggles flip-flop 262 such that its Q output goes high and H-switch 4 is switched to its ON state A, energizing winding W1. After a given delay provided by 264, for example 80° as in FIG. 5, flip-flop 262 is toggled again such that its Q output goes low and its $\bar{Q}$ output goes high and H-switch 4 is switched to its OFF state. Both H-switches are not OFF. After a further delay provided by 266, for example 20° as in FIG. 5, flip-flop 258 is toggled such that its $\bar{Q}$ output goes high and H-switch 5 is switched to its ON state A, energizing winding W2. At the next zero crossing, for example 80° later as in FIG. 5, flip-flop 258 is again toggled and its $\bar{Q}$ output goes low and its Q output goes high such that H-switch 5 is switched to its OFF state. For the operation in FIG. 4, delay 264 provides a 69° delay, and delay 266 provides an additional 42° delay. For the operation in FIG. 3, delay 264 provides approximately 90° delay and delay 266 provides only a momentary delay.

The AC signal from source 3 is also directed to a phase lock loop provided by phase detector 270 and voltage controlled oscillator 272. The output of VCO 272 is fed back through a divider 274, such as a counter, to the input of phase detector 270. As is known, if divider 274 performs a divide by 6 operation, then the output of VCO 272 will have a frequency 6 times as great as the input from source 3. The output of VCO 272 is delivered to a divider 276 which in the above example performs a divide by 5 operation, such that the output frequency of divider 276 is 6/5 as great as the AC input frequency from source 3. The output of divider 276 is delivered to zero crossing detector 278, whose output is the given frequency clock signal to one input of exclusive OR gate 280. The other input to gate 280 is supplied from zero crossing detector 252. The output of exclusive OR gate 280 is delivered through AND gate 282 to toggle flip-flop 284 between its Q and $\bar{Q}$ outputs to switch H-switch 5 between its ON states A and B as shown in FIG. 6.

Below a given motor speed, the output on line 286 from level detector 288 and tachometer 290 is low, in response to which gate 254 is enabled and gate 282 is disabled. In this start-up mode, circuit 250 thus provides the timing sequence in any of FIGS. 3 through 5. When the motor speed increases to a given level, line 286 goes high, which disables gate 254 and enables gate 282 such that zero crossing signals and the given frequency clock signal pass through the latter from exclusive OR gate 280 to toggle flip-flop 284 and provide the frequency converted run mode of FIG. 6. The output from gate 282 is also connected to flip-flop 262 to reset the latter to the OFF state to disconnect W1 from the AC source.

While the 60 hertz input AC line frequency and the 72 hertz output frequency have been given as examples, it is readily appreciated that other fractional frequency changes are within the scope of the invention. For example, in FIG. 8 divider 274 provides the numerator and divider 276 provides the denominator of the frequency change fraction. Furthermore, it is not necessary that H-switch 5 be controlled by some fraction of AC line frequency. For example, the switch can be toggled at a variable frequency rate.

The chopped sinusoid output waveform in W2 on timing line 152, FIG. 6 is not as efficient as the 60 hertz input waveform on line 150. This is because of the chopping and reversal of the various waveform segments preventing build-up of voltage. For example, in the negative half cycle provided by waveform segments 162 and 168, the voltage rises negatively and then falls back to zero at point 204 and then rises negatively again. This is not as efficient as a half cycle of a non-chopped sinusoid, but may be tolerated in certain applications where an increase in frequency is desired for only short periods of time compared with normal lower frequency run-time. As as additional mode, H-switch 5 can be left in its A or B ON state, and H-switch 4 in its OFF state, or vice versa, to run the motor at line frequency.

The invention is particularly useful for up conversion in certain motor control applications, specifically where an increase in frequency is desired for only short periods of time compared with normal lower frequency run-time. An example is refrigeration control where the compressor must be designed for the worst case situation even though such worst case occurs perhaps only 1% of the time, for example when a freezer must cool down a whole new supply of food. During the other 99% of the time, the compressor must only maintain an already cool condition, and thus may only need perhaps half its capacity. One solution to this over-capacity is to use a smaller compressor and run it at normal speed for normal duty, and run it at a higher speed during the small percentage of time needed for higher capacity cooling, i.e. during the 1% cool-down time. This faster speed operation is not detrimental to the compressor for short periods of time.

In the present invention, the AC frequency may be increased in a simple manner for running the compressor at a faster speed. A trade-off in the present frequency conversion technique is that the resultant chopped sinusoid output waveform of increased frequency is less efficient than the input AC frequency. This less efficient use of electrical power is far outweighed by the reduction in compressor capacity enabled thereby. Furthermore, during the 99% normal run-time, a smaller compressor is driven by a smaller motor at its most efficient load rating.

It is recognized that various modifications are possible within the scope of the appended claims.

We claim:

1. A start-up control and frequency conversion method for an AC motor control circuit having a first winding W1 connectable by first connection means to a pair of power lines L1 and L2 supplied by an AC source, and having a second motor winding W2 connected by an H-switch to L1 and L2, said H-switch having one ON state connecting L1 to the left end of W2 and connecting L2 to the right end of W2, said H-switch having another ON state connecting L2 to said left end of W2 and connecting L1 to said right end of W2,
said start-up control and frequency conversion method directly converting AC to AC, without intermediate conversion to DC, comprising switching said H-switch between said one and said other ON states to yield a fundamental frequency component start-up voltage waveform in W2 phase shifted from the voltage waveform in W1, and then switching said H-switch between said one and said other ON states at irregular times to yield a frequency converted switched output waveform.

2. The invention according to claim 1 wherein said start-up waveform and said frequency converted switched output waveform comprise chopped sinusoids generated without energy-storage phasing capacitors or inductors.

3. The invention according to claim 1 comprising:
providing said fundamental frequency component start-up voltage waveform by switching said H-switch to said other ON state at a zero crossing of the AC signal from said source, then switching said H-switch to said one ON state after a given delay and before the first successive next zero crossing of said AC signal, then switching said H-switch to said other ON state at said first successive zero crossing of said AC signal, then switching said H-switch to said one ON state after said given delay, then switching said H-switch to said other ON state at the second successive zero crossing of said AC signal, then switching said H-switch to said one ON state after said given delay, then switching said H-switch to said other ON state at the third successive zero crossing of said AC signal, and so on;
providing a given frequency clock signal; and
providing said frequency converted switched output waveform by switching said H-switch between said one and said other ON states in response to said given frequency clock signal and also switching said H-switch between said one and said other ON states in response to each said zero crossing of said AC signal except when said zero crossing and said clock signal coincide in time.

4. The invention according to claim 3 wherein the said frequency converted switched output waveform comprises a chopped sinusoid having an inflection point at each toggled transition of said H-switch between said one and said other ON states.

5. The invention according to claim 4 wherein said given delay equals about a quarter cycle of said AC source.

6. The invention according to claim 4 comprising exclusively ORing said clock signal and said zero crossings of said AC signal to toggle said H-switch to provide said frequency converted chopped sinusoid output waveform.

7. The invention according to claim 2 comprising cyclically toggling said H-switch between said one and said other ON states at twice the frequency of AC input signal zero crossings of said AC source to provide said start-up waveform, such that said chopped sinusoid start-up waveform in W2 is 90° out of phase with the voltage waveform in W1.

8. The invention according to claim 1 comprising providing said frequency converted switched output waveform by toggling said H-switch between said one and said other ON states at a given multiple of the frequency of AC input signal zero crossings of said AC source, and also toggling said H-switch between said one and said other ON states in response to each zero crossing of said AC signal except when said zero crossing and said multiple coincide in time.

9. The invention according to claim 8 wherein said frequency converted switched output waveform has a positive half cycle during which said H-switch is switched to said one ON state when L1 is positive and switched to said other ON state when L2 is positive, and said frequency converted switched output waveform has a negative half cycle during which said H-switch is switched to said one ON state when L1 is negative and switched to said other ON state when L2 is negative.

10. The invention according to claim 9 wherein said H-switch is toggled between said one and said other ON states by exclusively ORing said multiple and said zero crossings of said AC signal to provide said frequency converted switched output waveform having an inflection point at each switched transistion of said H-switch.

11. A start-up control and frequency conversion method for an AC motor control circuit having a first motor winding W1 connectable by first connection means to a pair of power lines L1 and L2 supplied by an AC source, and having a second motor winding W2 connected by an H-switch to L1 and L2, said H-switch having one ON state connecting L1 to the left end of W2 and connecting L2 to the right end of W2, said H-switch having another ON state connecting L2 to the left end of W2 and connecting L1 to the right end of W2, said start-up control and frequency conversion method directly converting AC to AC, without intermediate conversion to DC, comprising:

starting said motor by switching said H-switch from said one to said other ON state at each zero crossing of the AC signal from said source, and switching said H-switch from said other to said one ON state after a given delay following each said zero crossing of said AC signal and before the next successive zero crossing of said AC signal, such that a first portion of the first half cycle waveform of said AC signal in W1 corresponds to an opposite-going first portion first half cycle chopped waveform in W2, the second portion of the first half cycle waveform of said AC signal in W1 corresponds to a like-going second portion first half cycle chopped waveform in W2, the first portion of the second half cycle waveform of said AC signal in W1 corresponds to an opposite-going first portion second half cycle chopped waveform in W2, and the second portion of the second half cycle waveform of said AC signal in W1 corresponds to a like-going second portion second half cycle chopped waveform in W2, whereby the second portions of the first and second half cycle chopped waveforms in W2 are the same as in W1, and the first portions of the first and second half cycle chopped waveforms in W2 are the inversions of the waveforms in W1;

providing a given frequency clock signal; and running said motor at a converted frequency after start-up by alternately switching said H-switch between said one and said other ON states at irregular times by toggling said H-switch in response to said given frequency clock signal and also toggling said H-switch in response to each said zero crossing of said AC signal except when said zero crossing and said clock signal coincide in time.

12. The invention according to claim 11 wherein:

during said start-up, said given delay is one quarter cycle of said AC source such that said AC switch is toggled at twice the frequency of AC input signal zero crossings of said AC source, such that the rising from zero first quarter cycle waveform in W1 corresponds to a falling from zero first quarter cycle chopped waveform in W2, the second quarter cycle falling towards zero waveform in W1 corresponds to a falling towards zero second quarter cycle chopped waveform in W2, the third quarter cycle falling from zero waveform in W1 corresponds to a third quarter cycle rising from zero chopped waveform in W2, and the fourth quarter cycle rising towards zero waveform in W1 corresponds to a fourth quarter cycle rising towards zero chopped waveform in W2, whereby the second and fourth quarter chopped waveforms in W2 are the same as in W1, and the first and third quarter cycle chopped waveforms in W2 are the inversions of the waveforms in W1; and during said frequency converted run mode, said output waveform has an inflection point at each toggled transition of said H-switch.

13. A start-up control and frequency conversion method for an AC motor control circuit having first and second motor control windings W1 and W2 connected respectively by first and second H-switches to a pair of power lines L1 and L2 supplied by an AC source, each H-switch having one ON state connecting L1 to the left end of its respective said winding and connecting L2 to the right end of its respective said winding, each H-switch having another ON state connecting L2 to said left end of its respective said winding and connecting L1 to said right end of its respective said winding, and each H-switch having an OFF state disconnecting its respective said winding from said AC source, said start-up control and frequency conversion method directly converting AC to AC, without intermediate conversion to DC, comprising alternately switching said H-switches between said one ON state and said OFF state to yield a fundamental frequency component voltage waveform in W1 phase shifted from the fundamental frequency component voltage waveform in W2 for start-up, and then switching said first H-switch to said OFF state and alternately switching said second H-switch between said one and said other ON states at irregular times to yield a frequency converted switched output waveform.

14. The invention according to claim 13 comprising:

starting said motor by switching said first H-switch to said one ON state and switching said second H-switch to said OFF state at a zero crossing of the AC signal from said source, then switching said first H-switch to said OFF state after a given delay and before the first successive next zero crossing of said AC signal, then switching said second H-switch to said one ON state after a further delay following said given delay and before said first successive next zero crossing of said AC signal, then switching said first H-switch to said one ON state and switching said second H-switch to said OFF state at said first successive zero crossing of said AC signal, then switching said first H-switch to said OFF state after said given delay, then switching said second H-switch to said one ON state after said further delay, then switching said first H-switch to said one ON state and switching said second H-switch to said OFF state at the second successive zero crossing of said AC signal, then switching said first H-switch to said OFF state after said given delay, then switching said second H-switch to said one ON state after said further delay, then switching said first H-switch to said one ON state and switching said second H-switch to said OFF state at the third successive zero crossing of said AC signal, and so on; and running said motor in said frequency converted run mode by alternately switching said second H-switch between said one and said other ON states at irregular times to yield a chopped sinusoid output waveform having a positive half cycle during which said second H-switch is switched to said one ON state when L1 is positive with respect to L2 and switched to said other ON state when L2 is positive with respect to L1, and having a negative half cycle during which said second H-switch is switched to said one ON state when L1 is negative with respect to L2 and switched to said other ON state when L2 is negative with respect to L1.

15. The invention according to claim 14 wherein said given delay is approximately 80° of a cycle of said AC source, and said further delay is approximately 20° of a cycle of said AC source, such that in said start-up mode during a half cycle of said AC source W1 is energized for the first 80°, followed by 20° during which both of said H-switches are OFF, followed by energization of W2 for the remaining 80° of the half cycle, the resultant voltage waveform in W1 being phase shifted by approximately 74° the resultant voltage waveform in W2.

16. The invention according to claim 14 wherein said given delay is approximately 69° of a cycle of said AC source, and said further delay is approximately 42° of a cycle of said AC source, such that in said start-up mode during a half cycle of said AC source W1 is energized for the first 69°, followed by 42° during which both said H-switches are OFF, followed by energization of W2 for the remaining 69° of the half cycle, the resultant voltage waveform in W1 being phase shifted by approximately 90° from the resultant voltage waveform in W2.

17. The invention according to claim 14 wherein said given delay is approximately 90° of a cycle of said AC source, and said further delay is momentary such that in said start-up mode during a half cycle of said AC source W1 is energized for approximately the first 90°, momentarily followed by energization of W2 for approximately the remaining 90° of the half cycle, the resultant voltage waveform in W1 being phase shifted by approximately 65° from the resultant voltage waveform in W2.

18. The invention according to claim 13 comprising:
starting said motor by switching said first H-switch from said one ON state to said OFF state in alternating opposition to switching said second H-switch from said OFF state to said one ON state;
providing a given frequency clock signal; and
running said motor in said frequency converted mode by toggling said second H-switch between said one and said other ON states in response to said given frequency clock signal and also toggling said second H-switch in response to each zero crossing of the AC signal from said source except when said zero crossing and said clock signal coincide in time.

19. The invention according to claim 18 comprising in said start-up mode switching said first H-switch to said one ON state and switching said second H-switch to said OFF state at a zero crossing of said AC signal, then switching said first H-switch to said OFF state and switching said second H-switch to said one ON state after a given delay and before the first successive next zero crossing of said AC signal, then switching said first H-switch to said one ON state and switching said second H-switch to said OFF state at said first successive zero crossing of said AC signal, then switching said first H-switch to said OFF state and switching said second H-switch to said one ON state after said given delay, then switching said first H-switch to said one ON state and switching said second H-switch to said OFF state at the second successive zero crossing of said AC signal, then switching said first H-switch to said OFF state and switching said second H-switch to said one ON state after said given delay, then switching said first H-switch to said one ON state and switching said second H-switch to said OFF state at the third successive zero crossing of said AC signal, and so on, and wherein the switched output waveform in said frequency converted run mode is a chopped sinusoid having an inflection point at each toggled transition of said second H-switch between said one and said other ON states.

20. The invention according to claim 19 wherein:
said given delay equals one-quarter cycle of said AC source such that during said start-up said H-switches are cyclically switched in opposition between said one ON state and said OFF state at twice the frequency of AC input signal zero crossings of said AC source.

21. The invention according to claim 18 comprising exclusively ORing said clock signal and said zero crossings of said AC signal in said frequency converted run mode to toggle said second H-switch between said one and said other ON states.

22. A start-up control and frequency conversion method for an AC motor control circuit having first and second motor control windings W1 and W2 connected respectively by first and second H-switches to a pair of power lines L1 and L2 supplied by an AC source, each H-switch having one ON state connecting L1 to the left end of its respective said winding and connecting L2 to the right end of its respective said winding, each H-switch having another ON state connecting L2 to said left end of its respective said winding and connecting L1 to said right end of its respective said winding, each H-switch having an OFF state disconnecting its respective said winding from AC source,
said start-up control and frequency conversion method directly converting AC to AC, without intermediate conversion to DC, comprising:
starting said motor by switching said first H-switch to said one ON state and switching said second H-switch to said OFF state at each zero crossing of the AC signal from said source, and switching said first H-switch to said OFF state after a given delay following each said zero crossing of said AC signal and before the next successive zero crossing of said AC signal, and switching said second H-switch to said one ON state after a further delay following said given delay and before said next successive zero crossing of said AC signal, such that one portion of the first half cycle waveform of said AC signal corresponds to a like chopped waveform in W1, another portion of the first half cycle waveform of said AC signal corresponds to a like chopped waveform in W2, one portion of the second half cycle waveform of said AC signal corresponds of a like chopped waveform in W1, and another portion of the second half cycle waveform of said AC signal corresponds to a like chopped waveform in W2, whereby said one portions of the first and second half cycle waveforms of said AC signal are provided in W1, and said other portions of the first and second half cycle waveforms of said AC signal are provided in W2; and running said motor in a frequency converted run mode by alternately switching one of said H-switches between its one and other ON states at irregular times to yield a chopped sinusoid output waveform of a given fundamental frequency having a positive half cycle during which said H-switch is switched to said one ON state when L1 is positive with respect to L2 and switched to said other ON state when L2 is positive with respect to L1, and having a negative half cycle during which said H-switch is switched to said one ON state when L1 is negative with respect to L2 and switched to said other ON state when L2 is negative with respect to L1.

23. AC motor control start-up and frequency conversion apparatus for direct conversion from AC to AC, without intermediate conversion to DC, comprising in combination:

a pair of power lines L1 and L2 supplied by an AC source;

a first motor winding W1 connectable by first connection means to L1 and L2;

a second motor winding W2 connected by an H-switch to L1 and L2, said H-switch having one ON state connecting L1 to the left end of W2 and connecting L2 to the right end of W2, said H-switch having another ON state connecting L2 to the left end of W2 and connecting L1 to the right end of W2;

start-up means comprising control means for alternately switching said H-switch between said one ON state and said other ON state so as to yield a fundamental frequency component voltage waveform in W2 phase shifted from the voltage waveform in W1; and frequency conversion means including means for disconnecting W1 from said AC source and logic controlled timing means for alternately switching said H-switch between said one and said other ON states at irregular times to yield a frequency converted switched output waveform.

24. The invention according to claim 23 comprising means for providing a given frequency clock signal and wherein:

during said start-up said H-switch is switched to said other ON state at a zero crossing of the AC signal from said source, then said H-switch is switched to said one ON state after a given delay and before the first successive next zero crossing of said AC signal, then said H-switch is switched to said other ON state at said first successive next zero crossing of said AC signal, then said H-switch is switched to said one ON state after said given delay, then said H-switch is switched to said other ON state at the second successive zero crossing of said AC signal, then said H-switch is switched to said one ON state after said given delay, then said H-switch is switched to said other ON state at the third successive zero crossing of said AC signal, and so on; and during said frequency converted run mode said H-switch is toggled between said one and said other ON states in response to said given frequency clock signal and also toggled in response to each said zero crossing of said AC signal except when said zero crossing and said clock signal coincide in time.

25. The invention according to claim 24 wherein said frequency conversion timing means comprises given frequency clock signal means, zero crossing detector means for said AC signal, and means for exclusively ORing the output of said clock signal means and said zero crossing means for toggling said H-switch in response to a given frequency clock signal and also toggling said H-switch in response to each zero crossing of said AC signal except when said zero crossing and said clock signal coincide in time, such that the frequency converted switched output waveform is a chopped sinusoid having a positive half cycle during which said H-switch is switched to said one ON state when L1 is positive and switched to said other ON state when L2 is positive, and such that said frequency converted chopped sinusoid output waveform has a negative half cycle during which said H-switch is switched to said one ON state when L1 is negative and switched to said other ON state when L2 is negative.

26. The invention according to claim 25 comprising means for disabling the input to said exclusive OR means from said zero crossing means and for enabling pulse delay means to provide said given delay during said start-up.

27. The invention according to claim 25 comprising means for disabling the input to said exclusive OR means from said zero crossing detector means for said AC signal and for enabling multiplication means to toggle said H-switch at twice the frequency of AC input signal zero crossings of said AC source during said start-up.

28. The invention according to claim 27 wherein said enablement means enables said input to said exclusive OR means from said zero crossing detector means of said AC signal during said frequency converted run mode and also enables a given multiplication factor for said multiplication means to toggle said H-switch at a given multiple of the frequency of AC input signal zero crossings of said AC signal in addition to toggling of said H-switch in response to each zero crossing of said AC signal except when said zero crossing and said multiple coincide in time.

29. AC motor control apparatus for direct conversion from AC to AC, without intermediate conversion to DC, comprising:

a pair of power lines L1 and L2 supplied by an AC power source;

first and second motor windings W1 and W2 connected respectively by first and second H-switches to L1 and L2, each H-switch having one ON state connecting L1 to the left end of its respective said winding and connecting L2 to the right end of its respective said winding, each H-switch having another ON state connecting L2 to the left end of its respective said winding and connecting L1 to the right end of its respective said winding, each H-switch having an OFF state disconnecting its respective said winding from said AC source;

start-up means comprising control means for alternately switching said H-switches between said one ON state and said OFF state so as to yield a fundamental frequency component start-up voltage waveform in W1 phase shifted from the fundamental frequency component start-voltage waveform in W2; and frequency conversion means for switching said first H-switch to said OFF state and including timing means for alternating switching said second H-switch between said one and said other ON states at irregular times to yield a frequency converted switched output waveform.

30. The invention according to claim 29 wherein:

during the start-up mode, said first H-switch is switched to said one ON state and said second H-switch is switched to said OFF state at a zero crossing of the AC signal from said source, then said first H-switch is switched to said OFF state after a given delay and before the first successive next zero crossing of said AC signal, then said second H-switch is switched to said one ON state after a further delay and before said first successive next zero crossing of said AC signal, then said first H-switch is switched to said one ON state and said second H-switch is switched to said OFF state at said first successive next zero crossing of said AC signal, then said first H-switch is switched to said OFF state after said given delay, then said second H-switch is switched to said one ON state after said further delay, then said first H-switch is switched to said one ON state and said second H-switch is switched to said OFF state at the second successive zero crossing of said AC signal, then said first H-switch is switched to said OFF state after said given delay, then said second H-switch is switched to said one ON state after said further delay, then said first H-switch is switched to said one ON state and said second H-switch is switched to said OFF state at the third successive zero crossing of said AC signal, and so on; and during the frequency converted run mode, said frequency converted switched output waveform is a chopped sinusoid having a positive half cycle during which said second H-switch is switched to said one ON state when L1 is positive with respect to L2 and switched to said other ON state when L2 is positive with respect to L1, and having a negative half cycle during which said second H-switch is switched to said one ON state when L1 is negative with respect to L2 and switched to said other ON state when L2 is negative with respect to L1.

31. The invention according to claim 30 wherein said given delay is approximately 80° of a cycle of said AC source, and said further delay is approximately 20° of a cycle of said AC source, such that in said start-up mode during a half cycle of said AC source W1 is energized for about the first 80°, followed by about 20° during which both said H-switches are OFF, followed by energization of W2 for about the remaining 80° of the half cycle, the resultant voltage waveform in W1 being phase shifted by about 74° from the resultant voltage waveform in W2.

32. The invention according to claim 30 wherein said given delay is approximately 69° of a cycle of said AC source, and said further delay is approximately 42° of a cycle of said AC source, such that in said start-up mode during a half cycle of said AC source W1 is energized for about the first 69°, followed by about 42° during which both said H-switches are OFF, followed by energization of W2 for about the remaining 69° of the half cycle, the resultant voltage waveform in W1 being phase shifted by about 90° from the resultant voltage waveform in W2.

33. The invention according to claim 30 wherein said given delay is approximately 90° of a cycle of said AC source, and said further delay is momentary such that in said start-up mode during a half cycle of said AC source W1 is energized for about the first 90°, followed by a momentary delay during which both said H-switches are OFF, followed by energization of W2 for about the remaining 90° of the half cycle, the resultant voltage waveform in W1 being phase shifted by about 65° from the resultant voltage waveform in W2.

34. The invention according to claim 30 comprising means for providing a given frequency clock signal and wherein said frequency conversion timing means toggles said second H-switch between said one and said other ON states in response to said given frequency clock signal and also toggles said second H-switch in response to each said zero crossing of said AC signal except when said zero crossing and said clock signal coincide in time.

35. The invention according to claim 29 wherein said start-up means switches said first H-switch from said one ON state to said OFF state in alternating opposition to switching said second H-switch from said OFF state to said one ON state, and wherein said frequency conversion timing means toggles said second H-switch to provide a frequency converted chopped sinusoid output waveform in a frequency converted run-mode.

36. The invention according to claim 35 comprising means for providing a given frequency clock signal and wherein:

said start-up means switches said first H-switch to said one ON state and said second H-switch to said OFF state at a zero crossing of the AC signal from said source, then switches said first H-switch to said OFF state and switches said second H-switch to said one ON state after a given delay and before the first successive next zero crossing of said AC signal, then switches said first H-switch to said one ON state and switches said second H-switch to said OFF state at said first successive zero crossing of said AC signal, then switches said first H-switch to said OFF state and switches said second H-switch to said one ON state after said given delay, then switches said first H-switch to said one ON state and switches said second H-switch to said OFF state at the second successive zero crossing of said AC signal, then switches said first H-switch to said OFF state and switches said second H-switch to said one ON state after said given delay, then switches said first H-switch to said one ON state and switches said second H-switch to said OFF state at the third successive zero crossing of said AC signal, and so on; and said frequency conversion timing means toggles said second H-switch between said one and said other ON states in response to said given frequency clock signal and also toggles said second H-switch in response to each said zero crossing of said AC signal except when said zero crossing and said clock signal coincide in time.

37. The invention according to claim 30 wherein: said start-up control means includes zero crossing means for toggling said first H-switch to said one ON state and said second H-switch to said OFF state at each zero crossing of the AC signal from said source, and includes first pulse delay means for toggling said first H-switch to said OFF state after a given delay following each said zero crossing and before said first successive next zero crossing, and second pulse delay means for toggling said second H-switch to said one ON state after said further delay following said given delay and before said first successive next zero crossing, one portion of the first half cycle waveform of said AC signal corresponding to a like chopped waveform in W1, another portion of the first half cycle waveform of said AC signal corresponding to a like chopped waveform in W2, one portion of the second half cycle waveform of said AC signal, corresponding to a like chopped waveform in W1, another portion of the second half cycle waveform of said AC signal corresponding to a like chopped waveform in W2, whereby said one portions of the first and second half cycles of said AC signal are provided in W1, and said other portions of the first and second half cycles of said AC signal are provided in W2 during said start-up.

38. The invention according to claim 37 wherein said frequency conversion timing means includes given frequency clock signal means and means for exclusively ORing said clock signal and said zero crossings of said AC signal for toggling said second H-switch in response to a given frequency clock signal and also toggling said second H-switch in response to each zero crossing of said AC signal except when said zero crossing and said clock signal coincide in time, such that said second H-switch in said frequency converted run-mode generates a chopped sinusoid output waveform having a positive half cycle during which said second H-switch is switched to said one ON state when L1 is positive and switched to said other ON state when L2 is positive, and said frequency converted chopped sinusoid output waveform has a negative half cycle during which said second H-switch is switched to said one ON state when L1 is negative and switched to said other ON state when L2 is negative.

39. The invention according to claim 38 comprising means responsive to the termination of said start-up mode and including logic means for disabling said toggling of said first H-switch between said one ON state and said OFF state and for enabling toggling of said second H-switch between said one and said other ON states.

40. The invention according to claim 39 wherein the frequency converted chopped sinusoid output waveform has an inflection point at each switched transition of said second H-switch.

41. The invention according to claim 40 including logic means at the output of said exclusive OR means responsive to said exclusive OR means and to said start-up termination means to enable toggling of said second H-switch between said one and said other ON states in response to a given multiple of AC input signal zero crossing frequency of said AC source and in response to each zero crossing of said AC signal except when said zero crossing and said multiple coincide in time.

* * * * *

UNITED STATES PATENT AND TRADEMARK OFFICE
CERTIFICATE OF CORRECTION

PATENT NO. : 4,459,535
DATED : July 10, 1984
INVENTOR(S) : HERMAN P. SCHUTTEN ET AL It is certified that error appears in the above-identified patent and that said Letters Patent is hereby corrected as shown below:

In Column 2, line 34, cancel "ciruit" and insert --circuit--.

In Column 4, line 30, cancel "its".

In Column 9, line 34, cancel "as" (second occurrence), and insert --an--.

In Claim 11, column 12, line 3, the sentence beginning "running said motor" should be a new paragraph.

In Claim 15, column 13, line 44, after "74" insert --from--.

In Claim 22, column 15, line 13, cancel "of" and insert --to--.

Signed and Sealed this

Sixteenth Day of July 1985

[SEAL]

Attest:

DONALD J. QUIGG

*Attesting Officer*      *Acting Commissioner of Patents and Trademarks*